Figure 1:
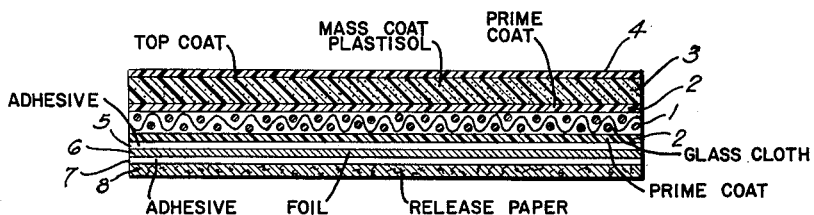

Oct. 30, 1962 G. H. SHERRARD ET AL 3,061,491
LAMINATED STRUCTURES
Filed July 24, 1959

INVENTORS.
GEORGE H. SHERRARD,
ZAVAN T. KHACHADOORIAN.
BY
ATTORNEY.

3,061,491
LAMINATED STRUCTURES
George H. Sherrard, Darien, and Zavan T. Khachadoorian, Greenwich, Conn., assignors to Cordo Chemical Corporation, Norwalk, Conn., a corporation of Connecticut
Filed July 24, 1959, Ser. No. 829,442
13 Claims. (Cl. 154—43)

The present invention relates to high density, low bulk, coated and laminated structures. More particularly, it is concerned with high density, low bulk, coated and laminated structures, such as fabrics and the like, containing at least one layer of dispersed metal or derivative of the same whose density is at least 8 or higher. Still more particularly, it relates to methods for preparing novel coated and laminated structures.

There exists a real need for a stable, low bulk material of good tensile strength and durability which would be capable of substantially eliminating low frequency sonic vibrations emanating from the panels in aircraft fuselages. In the past attempts have been made to dampen such low frequency sonic vibrations by applying or otherwise securing lead sheets to appropriate areas of the aircraft. Unfortunately, this technique for effecting sonic dampening is not wholly satisfactory. Rapid disintegration of the lead sheet occurs, thus rendering the use of such sheets substantially valueless. On disintegration, the lead sheet must be quickly replaced. This procedure is costly and time consuming. Another technique employed to dampen low frequency sonic vibrations in aircraft is to provide multiple laminations in the form of an integral, coated fabric. However, to obtain adequate sound dampening, excessively high bulky laminations had to be resorted to. In air ships unnecessary bulk cannot be tolerated. Consequently, this technique has not gained wide acceptance.

It is, therefore, a principal object of the present invention to provide a high density, low bulk, coated and laminated structure of good tensile strength and durability capable of eliminating substantially completely low frequency sonic vibrations in mechanical devices which are subject to vibrational influences. It is a further object to provide a flexible and durable high density coated and laminated fabric useful in the X-ray barrier field. It is a further object to provide a high density coated and laminated fabric in tape form capable of being wound about waste pipe in an atomic energy plant to eliminate radiation effects. Other objects and advantages will become apparent from the following description.

To this end, the above and other objects apparent to those skilled in the art can be accomplished in a simple and straight-forward manner by providing for a high density, low bulk, coated and laminated structure containing as one element thereof a dispersed, finely divided, metallic compound. Broadly, the element is provided in the form of either a high density metal per se or derivative of said metal dispersed in a plastisol.

It has been discovered that prior difficulties were due to the failure to provide a high density metallic filled plastisol which is termed hereinafter a "mass building coat." In its broadest aspect, therefore, the invention contemplates a unitary laminated structure comprising a mass building coat. It further contemplates laminated structures comprising a mass building coat in combination with a metallic foil applied to the surface of the mass building coat. In general, laminated structures of the latter type have been found to successfully overcome the shortcomings of the prior art practices.

According to the present invention unitary coated and laminated structures comprise the ensuing elements:

(1) A substrate of any natural or synthetic fiber, either woven or non-woven, such as glass fiber cloth, cotton or wool,
(2) A plastisol prime coat to be applied to the substrate,
(3) A mass building coat which comprises a plastisol and a dispersed metal compound whose specific gravity is about 8 or higher, and is applied to but one surface of the coated substrate (2) as by known methods of the art, such as knife on roll, floating knife, knife on blanket and reverse roll coater. If desired, the mass building coat may per se constitute the substrate in lieu of (1) above.
(4) An optional decorative top coat to be applied to the mass building coat for purposes of masking that coat. The decorative coat is principally a pigmented plastisol, analogous to the prime coat (2) above.
(5) A metallic foil applied to the opposite side or surface of the mass building coat, and
(6) Optionally, a pressure sensitive adhesive to be applied to the metallic foil, and finally
(7) A release paper attached to the pressure sensitive adhesive.

Figure 2:
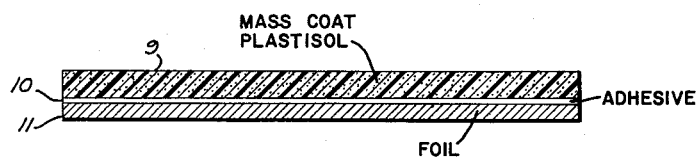
Figure 3:
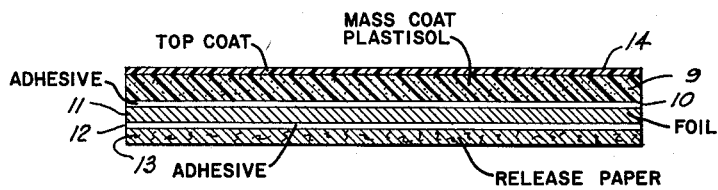

In order to describe our invention more clearly, we shall refer to the accompanying drawing in which:

FIG. 1 is a vertical cross-sectional view of a preferred embodiment of the invention constituting a low bulk, high density, coated and laminated structure, FIG. 2 is a vertical cross-sectional view of the high density, low bulk, coated and laminated structure in its broadest aspect, and FIG. 3 is a vertical cross-sectional view of a modified high density, low bulk, coated and laminated structure.

It is to be understood however, that the aforementioned figures of the drawing and the hereinafter presented example are presented solely by way of illustration and are not to be taken as a limitation upon the scope of the invention.

Referring to FIG. 1 of the drawing, a substrate 1 of glass fiber cloth or other suitable synthetic or natural fiber is impregnated or coated with a prime coat comprising a solvent modified plastisol, 2. To one surface of the coated substrate is applied metallic dispersed plastisol, 3. The newly prepared surface is covered with a decorative top coat, 4, consisting of pigmented solvent-modified plastisol. To the opposite surface an adhesive, 5, which adhesive may be either of the thermoplastic or thermosetting type is spread thereover, and a metal foil, 6, is next attached. A pressure sensitive adhesive, 7, comprising, for example, polystyrene, polybutyl methacrylate and methyl ethyl ketone is employed to coat the metal foil, 6. A release paper, 8, is attached to the available surface of the adhesive, 7, for ready use.

Another embodiment of the invention is shown in FIGS. 2 and 3 in which the substrate is a coat or layer, 9, of a high density metallic compound in powder form dispersed in a plastisol. Adhesive, 10, is applied to one surface and a metallic foil, 11, is added to cover the same. As is further shown in FIG. 3, the metallic foil, 11, is further modified by applying a double faced pressure sensitive adhesive, 12, thereto and, finally, supplying a release paper, 13. A top coat layer as shown in 14 is applied to the coat 9 containing dense metal compound.

It is an advantage of the present invention that the element comprising the substrate may be widely varied. In general, the substrate comprises, for instance, lead filled plastisol. This is prepared as by casting on release paper or on an endless metal belt and then stripped as an unsupported film. This substrate is illustrated in FIGS. 2 and 3 above. Alternatively, any synthetic or natural fiber either woven or non woven is utilized as the substrate. This modification is shown in FIG. 1 of the drawing. Thus, glass fiber fabric, cotton duck, wool, nylon and equivalents thereof are within the contemplation of the invention. Preferably, glass fiber fabric is employed herein for the principal reasons that such fabric is shrink resistant, fireproof and is dimensionally stable. Since the fabric is shrink resistant, highly efficient sound attenuating effects are realized when the fabric is subsequently coated with a high density metallic filled plastisol. This is probably due to shrinkage differences between the two laminae.

In general, the weight of the glass fiber fabric to be coated may vary from about 2.5 oz. per square yard to about 25 oz. per square yard. However, where a high density metallic filled plastisol is selected as the substrate, it has been noted from about 30 oz. per square yard to about 200 oz. per square yard can be used to avoid excessive bulk of the coated and laminated structure.

As previously mentioned, a prime coat is next applied to the glass fiber fabric substrate. The coat comprises a solvent modified plastisol, illustrative of which is a plastisol of polyvinyl halide, such as the corresponding fluoride, bromide or chloride, or copolymers of vinyl halide (such as, vinyl bromide or vinyl chloride) and vinyl acetate. Advantageously, the prime plastisol coat may comprise any resin system which is compatible with the mass building coat.

In the overall coated and laminated structure of the present invention, a layer characterized as the mass building coat is regarded as most essential. This coat comprises finely divided metal or metal compound in a plastisol. The specific gravity of the metal or metal compound is at least about 8 and possesses a particle size of from about 1 to about 50 microns. Typical high density metals are lead, mercury, platinum, gold, iridium and rhodium. An illustrative metal compound is lead oxide. The utilization of lead is preferred because of its relative high density of 11.3 and low cost consideration.

It has been found that the concentration of the metal or metal compound in the mass building coat is about 20% to about 90%, based on the weight of said mass building coat. In general, of from about 60% to about 80% of the metal or metal compound based on the weight of said mass building coat can advantageously be used. As little as 30 oz. per square yard and as much as 200 oz. per square yard are deposited as a mass building coat while avoiding excessive bulk in the laminated structure.

A decorative top coat may be applied, if desired, over the mass building coat to provide a suitable decorative effect. This coat comprises a solvent modified color pigmented plastisol. Additionally, the decorative effect may be still further enhanced (not shown in the drawing) by embossing the same.

Any suitable thermoplastic or thermosetting adhesive is applied on the surface of the laminate opposite the mass building coat to cause a metallic foil, such as aluminum, magnesium, titanium and the like to adhere thereto. When a metallic foil is applied, the lamina forms an effective barrier against migration of plasticizer from the prime coat into a double faced pressure sensitive adhesive which may be applied to the metallic foil lamina. The use of a metallic foil also reduces any curling of the overall laminate. It is believed that the curling effect is caused by the unequal shrinkage rates between the mass building coat and the fabric substrate.

Any commercially available double faced pressure sensitive adhesive is next applied to the metallic foil. Illustratively typical of such adhesives is one which contains polystyrene characterized as possessing a density of 1.03 and a melting point of 5° C. (20 parts by weight), polybutyl methacrylate (25 parts by weight), and methyl ethyl ketone (55 parts by weight).

The following example (taken in conjunction with FIG. 1 and is not deemed to be limitative) is supplied to illustrate a preferred embodiment of the invention. Unless otherwise specified the parts given are by weight.

*Example*

Glass fiber cloth weighing 5.6 oz. per square yard is impregnated and coated with about 5.0 oz. per square yard of a polyvinyl chloride prime coat comprising the formulation:

| | Parts |
|---|---|
| Polyvinyl chloride dispersion resin | 100 |
| Alkyl aryl phosphate | 15 |
| Di-isodecyl phthalate | 15 |
| Chlorinated paraffin | 10 |
| Epoxidized soy bean oil | 2 |
| Antimony trioxide | 24 |
| Tricresyl phosphate | 16 |
| Xylene | 10 |
| Apco thinner [1] | 10 |
| Di-basic lead phosphite | 8 |

[1] Petroleum solvent.

The so-coated fabric is next fused at temperatures of from about 375° F. to about 400° F. The latter is cooled to about room temperature. A coat of about 110 oz. per square yard of lead filled polyvinyl chloride plastisol is applied to one surface of the so impregnated fabric. The composition of the lead filled plastisol (mass building coat) consists essentially of the following:

| | Parts |
|---|---|
| Polyvinyl chloride dispersion resin | 100 |
| Di-decyl adipate | 35 |
| Di-capryl phthalate | 20 |
| Chlorinated paraffin | 10 |
| Epoxidized soy bean oil | 2 |
| Antimony trioxide | 32 |
| Tricresyl phosphate | 18 |
| Di-basic lead phosphite | 8 |
| Lead powder, 43 microns | 675 |

This coat is fused at 375° F.–400° F. and cooled subsequently. A white decorative coat is next applied to the lead filled plastisol lamina. The latter coat contains in addition to the prime coat composition, 2 parts of titanium dioxide. Approximately 2.5 oz. per square yard is applied and fusion of the coat is effected at temperatures between 375° F. and 400° F.

To the opposite surface is next applied about 1 oz. per square yard of thermoplastic adhesive material comprising:

| | Parts |
|---|---|
| Vinyl chloride-vinyl acetate copolymer | 25 |
| Dioctyl phthalate | 10 |
| Tricresyl phosphate | 6 |
| Trioctyl phosphate | 1 |
| Methyl ethyl ketone | 58 |

Alternatively, a thermosetting adhesive such as a rubber hydrochloride can be used. Aluminum foil of about one mil thickness is placed thereover and is laminated under heat (about 300° F.) and pressure (about 200 p.s.i.). On the thus laminated foil is next spread the aforementioned double faced sensitive adhesive which adheres to the aluminum foil and to a release paper which forms the outer lamina.

The overall coated laminate of the present invention may be fabricated in the form of flat sheets or rolls of tape in varied lengths and widths. As such, the coated laminated structure eliminates low frequency sonic vibrations and lessens radiation penetration.

It will be understood that variations may be made without departing from the spirit and scope of the invention. For instance, excellent results are obtained in a laminate as illustrated above utilizing 8 oz. army cotton duck or 5.5 oz. nylon as the substrate in lieu of glass fiber fabric. However, the fabric substrate as well as the impregnation of the same with a prime plastisol coat may be eliminated in toto. In that instance, the mass building coat in conjunction with a metallic foil backing has been found adequate as a laminate adapted to dampen sound as well as to lessen radiation penetration.

We claim:

1. A flexible, high density, low bulk, coated, laminated structure capable of damping low frequency sonic vibrations consisting essentially of a fabric substrate, a priming coat coating at least one side of said fabric substrate and a mass building coat containing a finely-divided metal-containing material having a specific gravity of at least 8 dispersed in a fused plastisol fused to said priming coat, said finely-divided metal-containing material being present in said mass building coat in an amount in the range 20–90% by weight of said mass building coat, said mass building coat weighing an amount in the range 30–200 ounces per square yard and said priming coat comprising a solvent modified plastisol compatible with said mass building coat.

2. A laminated structure in accordance with claim 1 wherein said finely-divided metal-containing material is lead.

3. A laminated structure in accordance with claim 1 wherein said fabric substrate is a glass fiber fabric.

4. A laminated structure in accordance with claim 1 wherein said fabric substrate is cotton duck.

5. A laminated structure in accordance with claim 1 wherein said fused plastisol is a polyvinyl chloride-containing plastisol.

6. A laminated structure in accordance with claim 1 wherein said fabric substrate is a glass fiber fabric and wherein said fused plastisol is a polyvinyl chloride-containing plastisol.

7. A laminated structure in accordance with claim 1 wherein said fabric substrate is cotton duck and wherein said fused plastisol is a polyvinyl chloride-containing plastisol.

8. A flexible, high density, low bulk, coated, laminated structure capable of damping low frequency sonic vibrations consisting essentially of a fabric substrate, a priming coat coating both sides of said fabric substrate and a mass building coat containing a finely-divided metal-containing material having a specific gravity of at least 8 dispersed in a fused polyvinyl chloride-containing plastisol fused to said priming coat on at least one side of said fabric substrate, said finely-divided metal-containing material being present in said mass building coat in an amount in the range 20–90% by weight of said mass building coat, said mass building coat weighing an amount in the range 30–200 ounces per square yard and said priming coat comprising a solvent modified plastisol compatible with said mass building coat.

9. A flexible, high density, low bulk, coated, laminated structure capable of damping low frequency sonic vibrations consisting essentially of a fabric substrate, a priming coat coating both sides of said fabric substrate, a mass building coat containing a finely-divided metal-containing material having a specific gravity of at least 8 dispersed in a fused plastisol fused to said priming coat on one side of said substrate, an adhesive coating bonded to the priming coat on the other side of said fabric substrate and a metallic foil attached to said adhesive coating, said finely-divided metal-containing material being present in said mass building coat in an amount in the range 20–90% by weight of said mass building coat, said mass building coat weighing an amount in the range 30–200 ounces per square yard and said priming coat comprising a solvent modified plastisol compatible with said mass building coat.

10. A laminated structure in accordance with claim 9 wherein a coating of pressure sensitive adhesive material is applied to said metallic foil and release paper is attached to said pressure sensitive material.

11. A flexible, high density, low bulk, coated, laminated structure capable of damping low frequency sonic vibrations consisting essentially of a mass building coat containing a finely-divided metal-containing material having a specific gravity of at least 8 dispersed in a fused plastisol, a layer of adhesive material deposited on said mass building coat and a metallic foil attached to said adhesive material, said finely-divided metal-containing material being present in said mass building coat in an amount in the range 20–90% by weight of said mass building coat and said mass building coat weighing an amount in the range 30–200 ounces per square yard.

12. A laminated structure in accordance with claim 11 wherein said metal-containing material is lead, wherein said plastisol is a polyvinyl chloride-containing plastisol and wherein said metallic foil is aluminum foil.

13. A laminated structure in accordance with claim 11 wherein pressure sensitive adhesive is applied to said metallic foil and release paper is attached to said pressure sensitive adhesive.

References Cited in the file of this patent

UNITED STATES PATENTS

| | | |
|---|---|---|
| 2,068,533 | Coffman | Jan. 19, 1937 |
| 2,804,416 | Phillipsen | Aug. 27, 1957 |
| 2,858,451 | Silversher | Oct. 28, 1958 |
| 2,904,689 | Masi et al. | Sept. 15, 1959 |
| 2,994,400 | Hiller | Aug. 1, 1961 |